US005972865A

United States Patent [19]

Knipe, Jr. et al.

[11] Patent Number: 5,972,865

[45] Date of Patent: Oct. 26, 1999

[54] WATER-BASED FLUSHING SOLUTION WITH LOW VOC CONTENT

[75] Inventors: Richard E. Knipe, Jr., Montebello, N.Y.; Savarimuthu M. Jacob, Edison, N.J.; Sheldon Green, Reeseville, Wis.

[73] Assignee: Dalco Industries, Ltd., Spring Valley, N.Y.

[21] Appl. No.: 09/070,122

[22] Filed: Apr. 30, 1998

Related U.S. Application Data

[60] Continuation-in-part of application No. 08/950,615, Oct. 15, 1997, Pat. No. 5,854,190, which is a division of application No. 08/784,315, Jan. 16, 1997, Pat. No. 5,701,922, which is a division of application No. 08/581,157, Dec. 29, 1995, Pat. No. 5,632,822.

[51] Int. Cl.[6] .................................. C11D 7/50; C09D 9/00

[52] U.S. Cl. .......................... 510/212; 510/206; 510/210; 510/500; 510/506; 134/38

[58] Field of Search ........................ 134/38, 40; 510/417, 510/201, 202, 206, 210, 212, 174, 505, 506, 407, 500, 422

[56] References Cited

U.S. PATENT DOCUMENTS

| | | | |
|---|---|---|---|
| 4,617,251 | 10/1986 | Sizensky | 430/256 |
| 4,673,524 | 6/1987 | Dean | 252/118 |
| 4,780,235 | 10/1988 | Jackson | 252/170 |
| 5,393,451 | 2/1995 | Koetzle | 252/170 |
| 5,498,805 | 3/1996 | Koetzle | 568/827 |
| 5,604,195 | 2/1997 | Misselyn et al. | 510/400 |

FOREIGN PATENT DOCUMENTS 09194892 7/1997 Japan .

*Primary Examiner*—Yogendra Gupta
*Assistant Examiner*—Gregory E. Webb
*Attorney, Agent, or Firm*—Nataro & Michalos P.C.

[57] ABSTRACT

A purge concentrate for purging paint spraying and other coating equipment has about 20%–60% by weight water; about 10%–40% by weight of an active solvent; about 10%–50% by weight of a co-solvent; about 1–9% by weight of a penetrant; and about 0.2–2.0% by weight wetting agent. It need not be heated to the curing temperature of heat curing paints and thus purges these paints more effectively.

6 Claims, 3 Drawing Sheets

WATER-BASED FLUSHING SOLUTION WITH LOW VOC CONTENT

CROSS-REFERENCE TO RELATED APPLICATION

This is a CIP of application Ser. No. 08/950,615 filed Oct. 15, 1997, now U.S. Pat. No. 5,854,190, which is a division of application Ser. No. 08/784,315 filed Jan. 16, 1997 and now U.S. Pat. No. 5,701,922, which was a division of application Ser. No. 08/581,157 filed Dec. 29, 1995 and now U.S. Pat. No. 5,632,822.

FIELD AND BACKGROUND OF THE INVENTION

The present invention relates in general to compositions, methods and apparatuses for flushing paints or other coatings from equipment such as automated and manual paint sprayers and paint dip installations, and in particular to a new and useful solution which is water-based and uses low amounts of volatile organic compound (VOC) solvents, which have conventionally been used in much greater concentrations for flushing paints and other coatings, in particular, non-water-based paints and other coatings.

U.S. Pat. Nos. 5,701,922 and 5,632,822 are both incorporated here for reference.

It is known to purge automated paint sprayers and paint dip equipment during maintenance and color changes using solvents based on:

| | |
|---|---|
| Alcohol | Fluorinated Hydrocarbon |
| Terpene | Aliphatic Hydrocarbon |
| Chlorinated solvent | Aromatic Hydrocarbon |

All of these solvents are considered hazardous and most forms are considered to be volatile organic compounds or VOC's. They may be used in the 100% pure form or as blends, using combinations of the solvents.

VOC's are heavily regulated by the Environmental Protection Agency (EPA) and by SARA and HAPS laws. The EPA regulates the amount of VOC which any particular company can emit into the atmosphere. This ceiling limits the production output of the company which, in particular, when automated equipment is used, it is much less than the total output that the company may be capable of sustaining without such regulations. The ceiling is particularly difficult to deal with also because these companies use paints which themselves contain high percentages of VOC solvents. The solvent percentages range from 5% to 80%, depending on the paint.

Current paints and other coatings fall into six categories as follows:

| | | |
|---|---|---|
| Epoxy | Polyester | Polyurethane |
| Polyamid | Enamels | Water Borne |

For the purpose of this disclosure, paints will be grouped into the general category referred to as coatings, which may include not only paints but other liquids meant to be coated onto surfaces. Coatings, in turn, are divided generally into VOC coatings containing some VOC solvents and non-VOC coatings, such as water-borne coatings.

Various automated and manual devices, equipment and techniques are known for applying coatings onto structures.

Among these is the use of electrostatic spraying equipment which pumps paint from a holding vessel or drum and sprays the paint through a manual air gun or automated, robot controlled, reciprocating paint nozzle, disc or bell-shaped applicator. The paint may also be pumped to a dip tank which applies the coating by dipping structures into the tank. For electrostatic coating, the paint is charged with 20,000 to 80,000 volts and applied to a grounded structure or substrate to be coated. The advantage to electrostatics is that it allows most of the coating to go directly onto the substrate and minimizes over-spraying and excess air emissions.

The use of electrostatic spraying thus reduces VOC discharge and permits high-volume application of coatings while still remaining within the strict EPA regulations. This technique also reduces the amount of paint used during the operation.

When a new color is needed for the substrates, all paint lines containing the last color must be purged. Currently this is done by drawing solvent from a holding vessel or drum and circulating it through the system lines and out through the sprayers or drains. Some of the solvent may be recirculated while a remainder of the solvent is disposed of as a hazardous waste. A new color is then introduced into the system. Problems associated with these types of solvents, whether they are VOC or not, include flammability, toxic fume exposure to employees, evaporative losses and odors.

One example of an electrostatic nozzle and other equipment particularly suited for robot-controlled coating, is manufactured by Binks Manufacturing Company of Franklin Park, Ill. One such nozzle supplied by Binks is known as the Mini-Mizer series, which is a high-speed circumferencial atomizer, especially suited for atomizing high-solids coatings, water-borne coatings and conventional solvent base coating systems.

Due to the presence of high voltage, a serious problem which occurs, in particular, during the purging operation, is the problem of arcing. Both the nozzles and the hoses and lines connected to the nozzles can pick up charges and pose an arcing hazard. Although conductive materials can be sprayed with the Mini-Mizer nozzle, the manufacturer of the nozzle advises users to utilize an extra degree of electrical insulation from ground, for the spray equipment.

One company which is involved in the spraying of substrates and which must comply with EPA regulations concerning emissions, is Lozier, which operates from seven different locations and which utilizes robotic spray booths. It is estimated that a company like Lozier would utilize approximately 4,000 gallons of cleanser per month for its seven locations for exclusive use in purging the spray equipment. It is common to require on the order of 40 color changes per day, switching colors among approximately 180 available colors. Each color change must be followed by a purge cycle which is as quick and effective as possible to permit quick restarting of the spraying equipment with a new color.

Reducing VOC's and other undesirable components from the purging fluid, would represent a substantial improvement in the field, resulting in increased production rates which are still within the EPA requirements.

Currently, acetone is not considered a VOC. Although many manufacturing facilities are using acetone to reduce their VOC emissions, there are some severe setbacks when using this alternative:

1. Acetone is highly flammable;

2. Acetone has severe overexposure precautions as it pertains to the user; and

3. Acetone by itself is ineffective and, therefore, is mixed with other solvents which are typically HAPS, VOC, flammable, and SARA regulated.

Typical formulations include:

30% Acetone 70% MEK (HAPS, SARA, Flammable)

40% Acetone 60% Xytene (HAPS, SARA, Flammable)

50% Acetone 50% Toluene (HAPS, SARA, Flammable)

These solvents still emit high levels of VOC (50–70%) and these blends are not water reducible, compared to the low VOC, low vapor pressure aqueous blends of the present invention which emit 6–15% VOC. The present invention is a dramatic improvement environmentally and produces a friendlier atmosphere for in-plant operation than acetone based solvents.

The present invention is also more closely tailored to use in purging equipment containing heat curable liquids, although other liquids can also be purged with the composition of the present invention.

SUMMARY OF THE INVENTION

The main object of the present invention is to provide a composition for replacing objectionable solvent blends which are currently used to purge automated and manual coating equipment, with a composition using water-based purging fluid and some small level of VOC content.

Two basic problems which were overcome according to the present invention were the formulation and conditions by which a water-based product can be used to purge coatings, in particular heat curing coatings, whether they are VOC or non-VOC based. Another problem was to provide a composition and conditions which can operate within an electrostatic environment, without causing arcing or other electricity related problems.

Both have been overcome by the present invention.

Another object of the present invention is to provide a composition, method and equipment which utilizes water-based purging fluids which do not have the problems of flammability, toxic fumes, evaporative losses or odor.

Another object of the present invention is to provide a coating purge composition which is an aqueous biodegradable solution which replaces the prior noxious flushing solvents and which can be used in a process which establishes a proper working strength and effective purging conditions, including elevated temperature, and proper water dilution rates for the purging fluid.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

IN THE DRAWINGS

DESCRIPTION OF THE PREFERRED EMBODIMENTS

Figure 1:
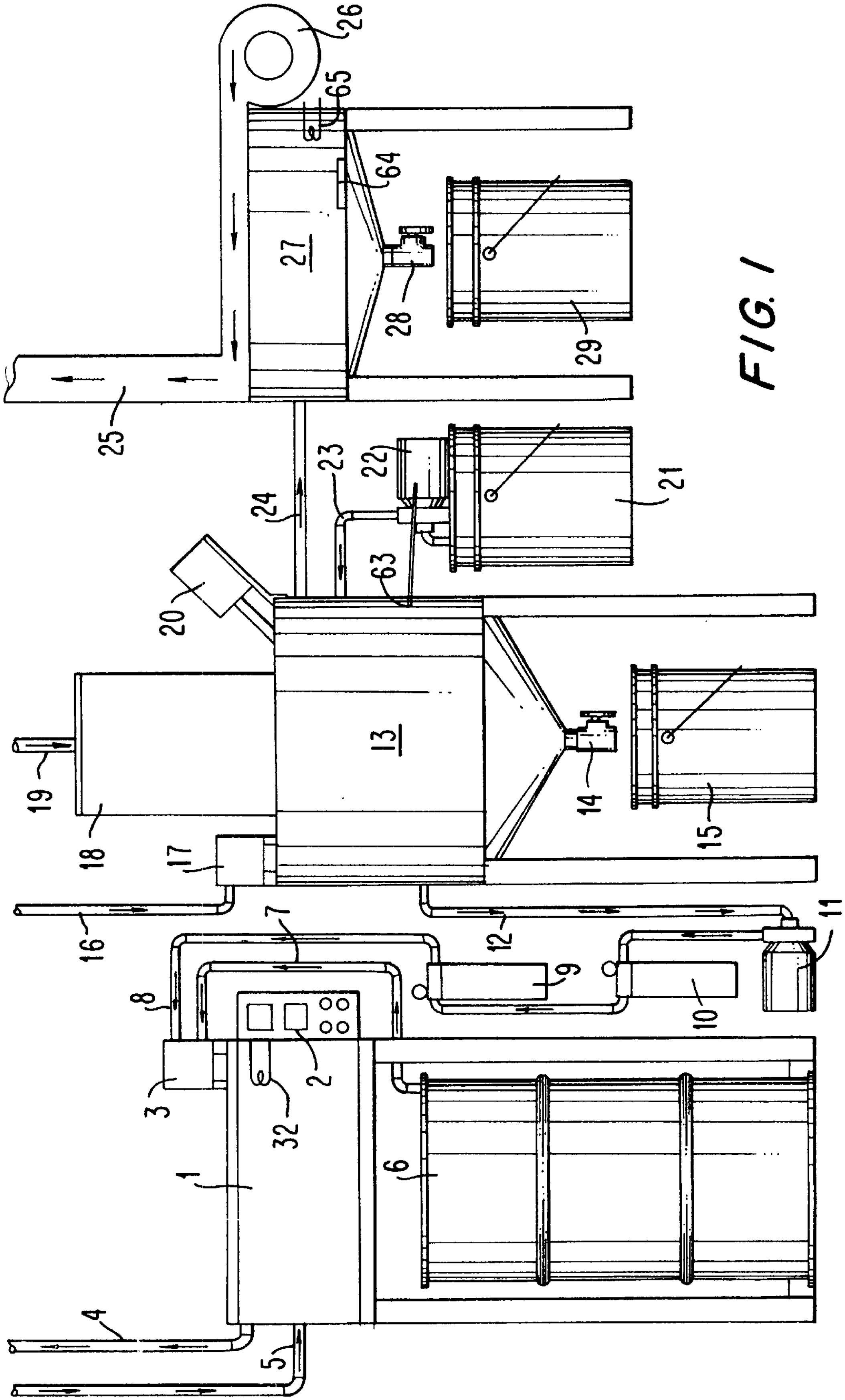
FIG. 1 is a schematic representation of the equipment of the present invention.

Referring to FIG. 1, in particular, the invention embodied therein comprises an apparatus for purging coating equipment such as paint lines, paint apparatus and paint sprayers. The apparatus of the invention includes a purge concentrate supply container, such as a supply drum 6 which contains the unique aqueous purge concentrate of the present invention, and a fresh purge concentrate line 7 connected to a dilution proportioning device 3 which receives dilution water from a line 8. The apparatus of the invention further includes a purge solution tank 1 for receiving metered amounts of the dilution water and purge concentrate. The proportioning device 3 is utilized to form a purge solution in the tank 1, the purge solution being a solution of the purge concentrate from drum 6 and the dilution water from supply line 8 at a carefully controlled and selected concentration range. In addition to the concentration range for the purge solution in tank 1, it is important to maintain a selected elevated temperature range for the solution in the tank. This is achieved using a heater 32. Throughout the system various level sensors, temperature sensors and other electronic or electromechanical devices are utilized. These are all connected to a system control 2. Both mechanical and electrical controls are included and are advantageously controlled by microprocessor. The microprocessor is also used to operate the various pumps, heaters, mixers, blowers and other necessary plumbing to control a process of the present invention.

An example of the solution proportioning device 3, is a venturi valve with the dilution water flow from line 8 being supplied at sufficient pressure, as controlled by a demand pump 11, to draw a correct metered amount of purge concentrate from drum 6 and along line 7. Other concentration range proportioning devices may also be utilized to control the concentration of the purge solution in tank 1, however.

It is also noted that the purge concentrate in supply tank 6, according to the unique water-based, low VOC composition of the present invention, contains a mixture of water, small amount of VOC, a detergent builder, such as an amine, and a wetting agent which contributes a detergent effect. An elevated alkalinity is required in conjunction with the neutral wetting agent. The use of amine is important especially where electrostatic paint equipment is involved, since its reduced conductivity is important to avoid problems associated with passing conductive liquids through the electrically chargeable apparatus. Although charges are usually removed during the purging phase, residual charges may exist, which may cause arcing and other electricity associated problems if an overly conductive purging solution is utilized.

Returning to the apparatus of the invention shown in FIG. 1, purge solution tank 1 is connected by a fresh solution supply line 4 to a paint manifold arrangement of coating equipment to be purged according to the present invention. The solution returns from that manifold along a return line 5, also connected to tank 1.

Figure 3:
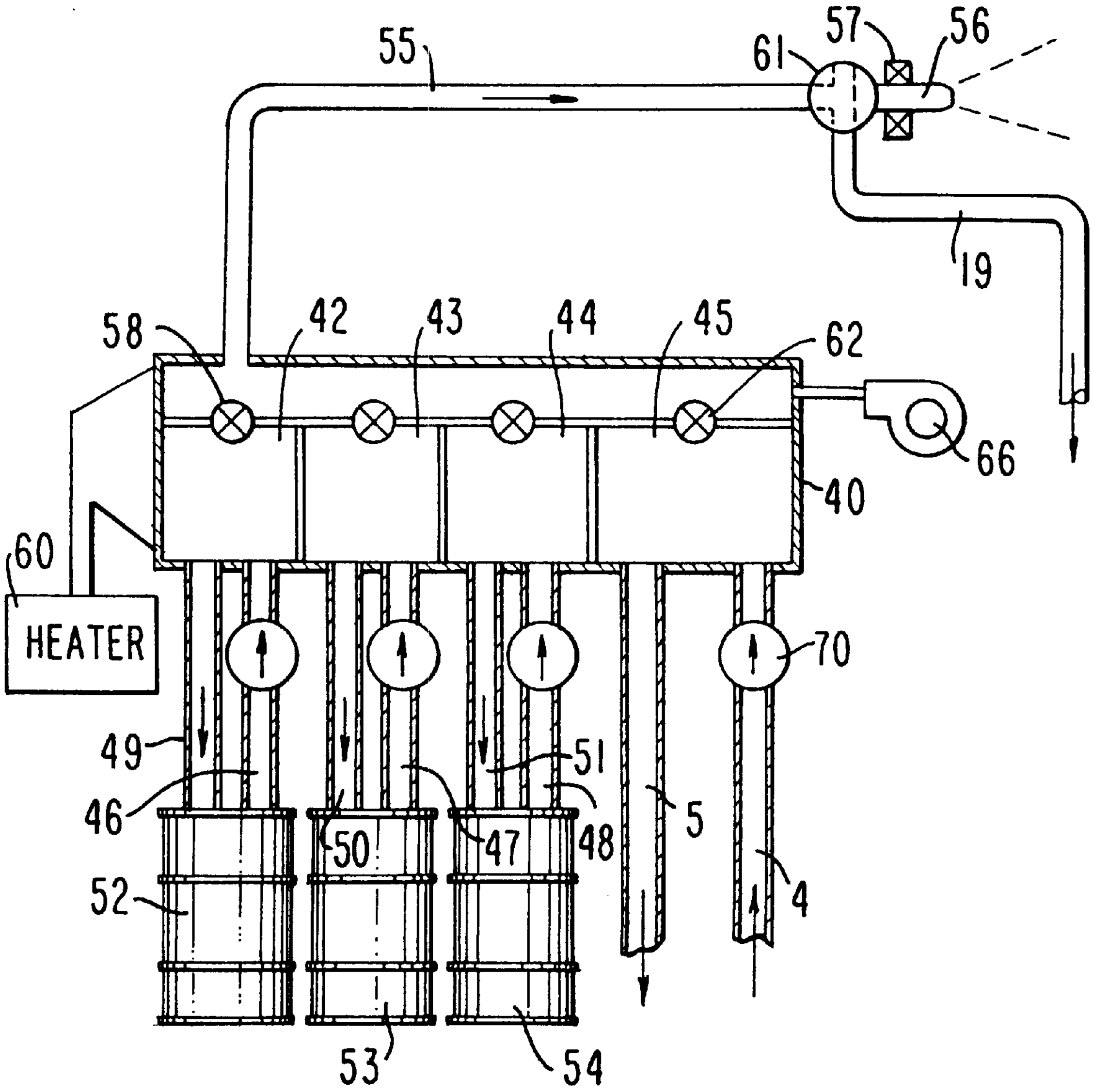
FIG. 3 is a schematic representation of a painting system with paint change manifold which incorporated the purge system of the present invention.

A pump 70 in FIG. 3, associated with the manifold 40 recirculates the heated solution from tank 1, to the manifold and back along lines 4 and 5. It is noted that the level of purge solution in tank 1 is controlled by a float (not shown) connected to the proportioning device 3. When the level falls, the float pulls an actuator in the venturi valve which starts the flow of water along line 8 by starting demand pump 11, and automatically draws proportioned amounts of fresh concentrate along line 7.

The temperature may be elevated and maintained at a selected elevated temperature range by heater 32 in tank 1, and throughout the recirculation system between tank 1 and the manifold 40 shown in FIG. 3. This maintains a supply of heated purge solution at correct concentration and that is continuously circulated. This also contrasts the present invention from prior art purge systems which simply blow VOC solvent through paint lines of the coating apparatus to purge the paint. It is noted that an advantageous temperature range for the purge solution is between about 100° F. and 160° F. It is also advantageous to maintain a dilution of purge concentrate with water, at a strength of about 5% to 50% by weight. The temperature range and concentration are continuously monitored and adjusted by control system 2.

Another advantage of the invention is that it utilizes the existing heated manifold 40, which is used in some automated spray applications. Such a manifold advantageously includes multiple chambers 42, 43, 44 and 45, each including an inlet with a pump, shown at 46, 47 48 and additional line 4. Return lines 49, 50 and 51, connect manifold chambers 42, 43 and 44 to separate paint drums 52, 53 and 54, which advantageously contain paints of different colors. Some paints are heat curable and should not be heated to their curing temperature while in the equipment to allow the paint to be easily supplied along a paint supply line 55 and to be sprayed through an atomizer or spray nozzle 56. For electrostatic spraying a charging head 57 is also provided for charging the nozzle to levels of 20,000 to 80,000 volts, typically. According to the present invention, the same circuitry and pumps which are used to maintain an elevated but not curing temperature for the various paints so that a quick color change can be achieved, are also utilized for the supply and return lines 4, 5, for supplying and returning the purge solution of the present invention.

According to the present invention a supplemental heater 60 may be utilized in conjunction with manifold 40 to maintain the elevated temperature for the circulating purging solution. In order to spray with a paint having a color in drum 52, valve 58 is opened which communicates chamber 42 with point line 55. A purge valve 61, which is shown in a purge position, is rotated into a paint supply position so that paint from drum 52 is supplied through nozzle 56 after it has picked up an electric charge from charging head 57. The paint is then effectively sprayed onto a substrate which is held at ground potential so that the paint is electrically attracted to the substrate. When a paint change to another color is required, for example, the paint in drum 53, valve 58 is closed and a valve 62 is opened for communicating purge chamber 45 with the paint line 55. Purge valve 61, for example, a T-valve, is rotated into the position shown in FIG. 3 so that the purge solution which is now burdened with paint and is thus a spent solution, is supplied along a dump line 19 to a neutralizing tank 13, in the apparatus of FIG. 1.

For a short time thereafter, valve 61 is rotated into a position communicating line 55 with nozzle 56 and a small amount of purge solution is sprayed through the nozzle to clean the nozzle. This solution also becomes spent, but it is only a very small amount which falls onto the floor of the paint booth and is not recirculated.

Returning to the apparatus of FIG. 1, the spent purge solution on line 19 is supplied to a bag filter 18 which removes a large percentage of the paint solids from the spent solution. The now filtered solution is supplied to a tank 13, where it's pH is sensed using conventional pH testing and acid supplying equipment. If the pH is too high, it is decreased by adding acid, such as 10% dilute sulfuric acid from an acid drum 21 by an acid feed pump 22 along an acid feed line 23. Acid pump 22 is connected to the pH sensor shown schematically at 63 and is a commercially available apparatus. Acid pump 22 and sensor 63 are set to adjust the solution in tank 13 to about 8.0 to 9.5 pH.

Additional paint separation takes place in tank 13 by virtue of the fact that the paint settles to the bottom of the tank where this paint sludge can be discharged by opening a paint sludge dump valve 14, which discharges the paint sludge into a paint sludge drum 15. Fresh make-up water is supplied over pressurized water line 16 through a second proportioning device 17, which senses the level of liquid in tank 13 and if insufficient liquid is available, opens line 16 until the correct level is reached. A mixer 20 is also provided for mixing the contents of the tank 13 to condition the recirculated purge solution.

As controlled by demand pump 11, which in turn is controlled by the level sensor in tank 1, reconditioned dilution water is supplied from tank 13 along line 12 to a first filter 10, which in a preferred embodiment of the invention is a 25 micron filter. This is connected in series to a second 10 micron filter 9, which then supplies the filtered dilution water to line 8.

It is noted that bag filter 18 must be cleaned periodically and filters 9 and 10 must be replaced periodically.

Together, elements 13–23 form conditioning means of the present invention for conditioning the recirculated spent solution.

The apparatus of the present invention shown in FIG. 1 also includes an overflow line 23, which is connected between the top of tank 13 and an evaporation tank 27, which contains an air agitator 64 and a heater 65 for heating and agitating the overflow from neutralizing tank 13. Evaporating tank 27 is used in case too much solution has accumulated in tank 13. The overflow solution is converted into vapor and removed by a blower 26 and duct 25.

Any residue in evaporator tank 27 can be discharged periodically by opening an evaporator drain 28, which discharges into an evaporator sludge drum 29.

Figure 2:
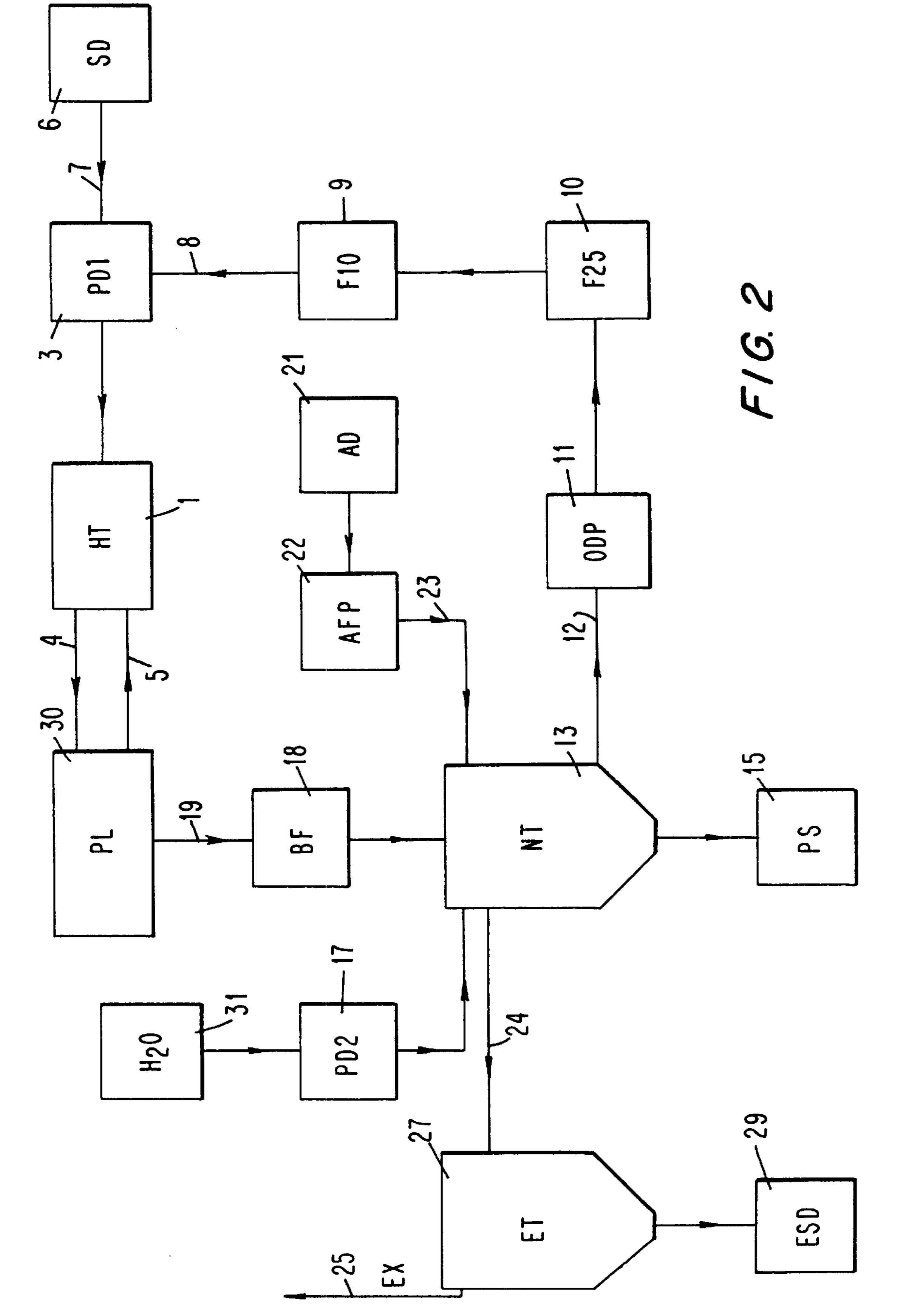
FIG. 2 is a schematic representation of a closed loop coating purge system, also according to the present invention.

FIG. 2 illustrates the process of the present invention. It is noted that throughout the figures the same reference numerals are used to designate the same or functionally similar parts.

As shown in FIG. 2, heating tank 1 recirculates heated solution at the selected concentration to and from the coating equipment (e.g., paint lines PL) shown schematically at 30. When a purge cycle is required between a color change, spent solution is discharged from equipment 30 along dump line 19 to bag filter 18, and thereafter to tank 13. pH control equipment in the form of acid drum 21 and acid pump 22 supply acid along line 23 to maintain the proper pH of the reconditioned solution in tank 13. The reconditioned solution is allowed to reside in tank 13 for a time to allow additional solids to settle out and be discharged over gate a valve (14 in FIG. 1) into paint sludge drum 15. Make-up water from a water supply 31 can be provided over line 16 to liquid level proportion device 17 and thereafter to tank 13. Overflow line 24 supplies overflow liquid from tank 13 to evaporator tank 27 which has a lower discharge to evaporator sludge drum 29 and an upper discharge to exhaust duct 25. On demand, pump 11 supplies reconditioned dilution water from line 12 to the series connected filters 10 and 9, thereafter to water supply line 8 and the first liquid proportioning device 3. Supply drum 6 provides the metered amount of purge concentrate along line 7, and the concentrate with correct concentration range is supplied to heating tank 1.

Typical purge sequences for automated equipment such as the equipment shown in FIG. 3, includes a combination of purging with compressed air and with purge solution. Compressed air can be supplied by blow 66 as shown in FIG. 3, and discharged through a port of valve 61 which is opposite from line 19. The sequence may be as follows:

| Time Value(s) | Sequence Function |
|---|---|
| 3 to 10 Seconds | Compressed Air Purge |
| 3 to 15 Seconds | Solution Purge |
| 3 to 10 Seconds | Compressed Air Purge |
| 3 to 10 Seconds | Purge Solution to Dump Line 19 |
| 3 to 10 Seconds | Compressed Air Purge Through Dump Line 19 |
| 2 to 5 Seconds | Polychem Product Purge Through Sprayer 56 |
| 10 to 20 Seconds | Compressed Air Purge Through Sprayer 56 |

Additional valving may be utilized to divert the compressed air through the various lines for achieving the sequence function.

For non-automatic lines, the solution of the present invention is used from a container and is still functional as long as the solution is maintained at its elevated temperature. Generally, greater compression purge cycles are needed, for example, from 5 to 10 seconds.

Preferred embodiments of the compositions of the present invention are two unique formulations comprising active solvents, co-solvents, penetrants and wetting agents to dissolve and lift uncured and cured resins off surface for general paint line cleaning and stripping.

The active solvents include, but are not limited to, dibasic ester mixture and propylene glycol methyl ether acetate. Such active solvents include esters with lower vapor pressure, higher flash point and other physical properties of pleasant odor and solubility in other co or primary solvent and water.

The co-solvents include, but are not limited to, dipropylene glycol methyl ether, propylene and dipropylene glycol ethers are so chosen to be HAPS (Hazardous Air Polluting Substance) free.

Methyl ethers of propylene glycol, dipropylene glycol or tripropylene glycol or higher homologs or phenyl ethers and homologs may also be included in this group such that the solubility in water and higher flash point of the composition resulting are also considered for the purpose of purging the paint lines.

The pH of the purge solution is in the range of 8.0–9.5. The pH is essentially due to an amine compound, including monoethanol amine, triethanol amine, or heterocyclic amine and other amine derivative of n-methyl pyrrolidone which will also have surface active property.

The surfactant in the first blend are so chosen to have both high foaming characteristics and critical higher critical micelle temperature which enable it to be efficient at higher temperature range (150°–190° F.).

The surfactant in the second blend were chosen to have low foam and to have lower critical micelle temperature which enable it to be efficient at ambient up to 120° F., without enhancing the cross linking or curing the paint to be purged.

| INGREDIENTS | CAS # | WT % | PREFERRED RANGE |
|---|---|---|---|
| First Blend | | | |
| 1. Water | 7732-18-5 | 35.0 | 20–60 |
| 2. Dibasic esters, Mixture | 119-40-0, 627-93-0, 106-65-0 | 25.0 | 10–40 |
| 3. Dipropylene glycol methyl ether | 34590-94-8 | 30.0 | 10–50 |
| 4. Non-ionic Surfactant | 127087-87-0 | 1.0 | 0.2–2.0 |
| 5. Dodecyl benzene sulfonic acid, mono ethanol amine soap | — | 3.0 | 1–5 |
| 6. EDTA | 64-02-8 | 1.0 | 0.5–1.5 |
| 7. Propylene glycol methyl ether acetate | 108-65-6 | 5.0 | 2–10 |
| | | 100.0 | |
| Second Blend | | | |
| 1. Water | 7732-18-5 | 35.0 | 20–60 |
| 2. Dibasic esters, Mixture | 119-40-0, 627-93-0, 106-65-0 | 23.0 | 10–40 |
| 3. Dipropylene glycol methyl ether | 34590-94-8 | 30.0 | 10–50 |
| 4. Non-ionic Surfactant | 127087-87-0 | 1.0 | 0.2–2.0 |
| 5. Amine neutralized carboxylic acid soap and Anionic Surfactant | — | 5.0 | 2–9 |
| 6. EDTA | 64-02-8 | 1.0 | 0.5–1.5 |
| 7. Propylene glycol methyl ether acetate | 108-65-6 | 5.0 | 2–10 |
| | | 100.0 | |

FIGS. 1 and 2 with the low VOC aqueous formulation of the present invention at a circulation temperature of 110° F., it was found that a coating system can be fully purged in ten seconds at a line pressure of 30–50 psi.

Under the same temperature and pressure conditions, the same formulation with no VOCs took 20 seconds to completely purge. This illustrates the effectiveness of the present invention and the use of a small amount of VOC to improve purge performance and reduce the maximum temperature required for the purging operation to eliminate curing of heat curable liquids inside the coating equipment.

The present invention is capable of purging two component systems (a resin and hardener) as well as air dried coatings. The low VOC content of the formulation of the present invention can be used whenever the zero VOC formulation of U.S. Pat. No. 5,632,822 cannot be utilized because it is either not effective enough or it causes curing of the liquid to be purged within the lines or other portions of the equipment. The present invention can also be utilized where lower solution temperatures are required during the purging operation.

In testing the effectiveness of the present invention, a user used a single component and a two component coating process of the present invention. His single component paint required a line purge time of 10 seconds. This was accomplished with a zero VOC material as in the U.S. Pat. No. 5,701,922 apparatus as well as the U.S. Pat. No. 5,632,822 process.

The two component coatings, such as two part epoxies and isocyonate urethanes, are temperature and moisture sensitive and although the zero VOC solution can purge the two component system, it is ineffective in accomplishing it within the time frame requirement of the customer. This typically happens because the zero VOC aqueous formulation requires a temperature reduction from its optimum performance level of 130° F. to its reduced performance level of 110° F. This temperature reduction specification is needed due to the temperature sensitivity of the coating as it relates to curing or premature activation of the coatings catalyzing function. This is a condition that must be avoided in order to insure total and thorough evacuation of the electrostatic or non-electrostatic paint-line in order to avoid clogging and/or subsequent cross contamination of a newly introduced coating color. The low levels of low vapor pressure, water soluble and water emulsifiable solvents in formulations that otherwise are similar to those references in U.S. Pat. Nos. 5,632,822 and 5,701,922 enable the lower temperature material to be as effective and often more effective than the zero VOC (solvent free) system within a specific time frame equipment. VOC (volatile organic compounds) is defined as solvents which are photochemical reactive.

Low VOC formulations of this application are based on in-use formulas (post water dilutions) of no greater than 15% of VOC (solvent) which is equal to less than 1.5 lb. total VOC. Solvents that are selected are non-flammable in the formulation and are not regulated by SARA or HAPS laws.

The total VOC content in the formula which is approximately 60% is reduced by the customer with water at concentration strengths that range between 5% to 25% levels with the predominant ingredient being water.

These low VOC formulations are applicable to the already patented apparatus of U.S. Pat. No. 5,701,922 and all other suitable applications.

It is important to note that these low VOC/aqueous formulations reduce average VOC emissions by 85–94% in all manufacturing facilities.

While the specific embodiments of the invention have been shown and described in detail to illustrate the application of the principles of the invention, it will be understood that the invention may be embodied otherwise without departing from such principles.

What is claimed is:

1. A purge concentrate for purging coating equipment comprising:

about 20%–60% by weight water;

about 10%–40% by weight of an active solvent;

about 10%–50% by weight of a co-solvent;

about 1%–9% by weight of a penetrant;

about 0.2%–2.0% by weight wetting agent; and about 0.5%–1.5% by weight EDTA;

the solvent being a dibasic ester mixture and propylene glycol methyl ether acetate, the co-solvent being an ether and the wetting agent being a non-ionic surfactant, the purge concentrate being adapted for purging coatings which are resistant to water-based solvents.

2. A purge concentrate according to claim 1 wherein the penetrant is a soap.

3. A purge concentrate according to claim 1 wherein the penetrant comprises an amine compound and the concentrate has a pH in the range of about 8 to about 9.5.

4. A purge concentrate according to claim 3 wherein the amine compound is selected from the group consisting of monoethylene amine, triethanol amine, heterocyclic amide and amine derivatives of N. Methyl pyrrolidine.

5. A purge concentrate according to claim 1 wherein the wetting agent is a surfactant selected to have high foaming characteristic and high critical micelle temperature which enhances purging at a temperature range of 150 to 190° F.

6. A purge concentrate according to claim 1 wherein the wetting agent is a surfactant chosen to have low foam and low critical micelle temperature which improves purging at temperatures up to 100° F. to avoid curing of heat curable coatings to be purged.

* * * * *